(12) United States Patent
Oba et al.

(10) Patent No.: US 6,525,132 B1
(45) Date of Patent: Feb. 25, 2003

(54) CHLOROPRENE LATEX COMPOSITION, PROCESS FOR PRODUCING THE SAME, AND ADHESIVE COMPOSITION COMPRISING THE SAME

(75) Inventors: Hiroaki Oba, Niigata (JP); Tsuyoshi Tsuji, Niigata (JP); Mikio Yamaguchi, Niigata (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/744,669

(22) PCT Filed: May 27, 1999

(86) PCT No.: PCT/JP99/02787

§ 371 (c)(1),
(2), (4) Date: Jan. 29, 2001

(87) PCT Pub. No.: WO00/73385

PCT Pub. Date: Dec. 7, 2000

(51) Int. Cl.[7] .................................................. C08L 93/00
(52) U.S. Cl. ....................................................... 524/764
(58) Field of Search ......................................... 524/764

(56) References Cited

U.S. PATENT DOCUMENTS

| | | | |
|---|---|---|---|
| 5,523,355 A | 6/1996 | Oba et al. | |
| 5,567,771 A | 10/1996 | Tsuji et al. | |
| 5,624,993 A | 4/1997 | Tsuji et al. | |

FOREIGN PATENT DOCUMENTS

| | | |
|---|---|---|
| JP | 48-076981 | 10/1973 |
| JP | 52-066952 | 6/1977 |
| JP | 52-068250 | 6/1977 |
| JP | 52-071545 | 6/1977 |

*Primary Examiner*—Edward J. Cain
(74) *Attorney, Agent, or Firm*—Oblon, Spivak, McClelland, Maier & Neustadt, P.C.

(57) ABSTRACT

A chloroprene latex composition wherein the gel content of the chloroprene polymer is from 3 to 40 wt %, and the weight average molecular weight of the sol content is at least 400,000, and a chloroprene latex is presented which is excellent in the initial adhesive performance and normal adhesive performance and which has a good balance of heat resistance, water resistance, etc. with the adhesive properties.

7 Claims, No Drawings

CHLOROPRENE LATEX COMPOSITION, PROCESS FOR PRODUCING THE SAME, AND ADHESIVE COMPOSITION COMPRISING THE SAME

TECHNICAL FIELD

The present invention relates to a polychloroprene latex composition useful as an adhesive, and a method for its production and an adhesive composition employing it. More particularly, it relates to a chloroprene latex composition which is excellent in the initial adhesive performance and which is excellent in the balance of the heat resistance, water resistance, etc. with the adhesive properties, and a method for its production and an adhesive composition employing it.

BACKGROUND ART

Heretofore, adhesives using polychloroprene as a base were mainly of a solvent type. However, in recent years, demand for not employing a solvent has increased in view of problems such as toxicity, possible danger of fire and environmental pollution by an organic solvent during the production or use of solvent type adhesives. As a method for not employing a solvent, a method of substituting a latex adhesive for a solvent type adhesive is considered to be effective, and a study has been actively conducted on latex adhesives using various polymers.

Among them, a chloroprene latex adhesive is coated on both adherends to be bonded, such adhesive layers are dried and then bonded, whereby it exhibits high adhesiveness immediately after the bonding. From such a characteristic, it is expected to be useful as an aqueous contact type adhesive, but on the other hand, it is not necessarily satisfactory in the initial adhesive performance and in the balance of the heat resistance, water resistance, etc. with the adhesive properties, and improvements in this respect have been desired.

For example, JP-B-51-39262 discloses a method for producing a polychloroprene latex adhesive, wherein from 3 to 5 parts by weight of a long chain fatty acid or a rosinate is used as an emulsifier, per 100 parts by weight of chloroprene, and the monomer is polymerized at a temperature lower than 20° C. in an alkaline emulsion in the presence of from 0.09 to 0.15 part by weight of n-dodecyl mercaptan, and polymerization is terminated when the conversion of the monomer reaches from 90 to 98% to obtain a latex of polychloroprene containing from 40 to 90 wt % of a gel content, and a tackifier resin is blended thereto. However, latexes prepared in accordance with Examples of such publication lack in the contact property, and in order to make contact adhesion possible, a large amount of a tackifier resin is required to be added, and it takes time for the development of the strength, and the initial adhesive performance has not been necessarily satisfactory.

The present invention is intended to solve such problems of the prior art and to provide a chloroprene latex composition which is excellent in the initial adhesive performance and which is excellent also in the balance of the heat resistance and the water resistance, a method for its production and an adhesive composition employing it.

DISCLOSURE OF THE INVENTION

The present inventors have conducted extensive studies to solve the above problems, and as a result, have found it possible to obtain a chloroprene latex adhesive composition which is excellent in the initial adhesive performance and which is excellent also in the balance of the heat resistance, water resistance, etc. with the adhesive properties by a chloroprene latex composition having a certain specific amount of a gel content and a certain specific molecular weight of sol, and have accomplished the present invention.

Namely, the present invention provides a chloroprene latex composition comprising a chloroprene polymer containing from 3 to 40 wt % of a gel content and having a weight average molecular weight of sol of at least 400,000, and a method for its production and an adhesive composition employing it.

Further, the present invention provides the above-mentioned chloroprene latex composition wherein the chloroprene polymer is one obtained by polymerizing chloroprene, using a rosinate as an emulsifier, in the presence of a chain transfer agent at a temperature lower than 30° C. to a conversion of the monomer of from 80 to 95%, and the solid content concentration in the latex is from 45 to 65 wt %.

Further, the present invention provides the above-mentioned chloroprene latex composition wherein the emulsifier is potassium rosinate, and the polymerization is carried out in the presence of excess potassium hydroxide, a method for producing such a chloroprene latex composition, and an adhesive composition obtained by adding a tackifier resin to such a chloroprene latex composition.

Now, the present invention will be described in detail. The chloroprene polymer in the present invention is a homopolymer of 2-chloro-1,3-butadiene (hereinafter referred to as chloroprene), or a copolymer obtained by copolymerizing chloroprene with at least one monomer copolymerizable with chloroprene.

As the monomer copolymerizable with chloroprene in the present invention, 2,3-dichloro-1,3-butadiene, 1-chloro-1,3-butadiene, butadiene, isoprene, styrene, acrylonitrile, acrylic acid and its esters, methacrylic acid and its esters, may, for example, be mentioned, and if necessary, two or more types may be employed.

The gel content in the chloroprene polymer in the present invention is meant for the content of a component insoluble in a toluene solvent, and the sol is meant for a soluble component. In the chloroprene polymer in the present invention, the gel content is required to be within a range of from 3 to 40 wt %.

Further, the gel content was measured by the following method. The latex was freeze-dried (the weight was A) and dissolved in toluene at 23° C. for 20 hours (to adjust the concentration to 0.6 wt %), and using a centrifugal separator, and further using a 200 mesh metal net, the insoluble content i.e. the gel was separated. The gel content was dried in air and then dried in an atmosphere of 110° C. for one hour (the weight was B). The gel content was calculated by the following formula.

Gel content=$B/A \times 100(\%)$

Further, in the present invention, the weight average molecular weight of the sol in the chloroprene polymer i.e. the toluene solvent-soluble component, plays an important role, and the weight average molecular weight of the chloroprene polymer of the present invention is required to be at least 400,000. A preferred range of the weight average molecular weight is from 400,000 to 1,200,000.

In the present invention, the gel content and the weight average molecular weight of the sol in the chloroprene polymer are defined as mentioned above, for the following reasons.

Development of the excellent initial adhesive performance in the present invention is attributable to the fact that the chloroprene polymer contains a large amount of sol excellent in molecular motion. Accordingly, fusion of chloroprene molecular chains at the adhesive interface takes place swiftly to instantaneously develop the adhesive strength, whereby it is possible to develop an excellent initial adhesive performance. If the gel content of the chloroprene polymer exceeds 40 wt %, this initial adhesive performance decreases substantially, such being undesirable.

On the other hand, in chloroprene latex adhesives which were commonly known, a chloroprene polymer having a low gel content tended to be poor in heat resistance, and the balance of the heat resistance with the initial adhesive property was poor. In the present invention, an excellent balance of the initial adhesive performance and the heat resistance has been made possible by adjusting the gel content of the chloroprene polymer to be from 3 to 40 wt % and adjusting the weight average molecular weight of the sol to be at least 400,000. If the gel content is less than 3 wt %, or the weight average molecular weight of the sol is less than 400,000, the heat resistance decreases substantially.

Further, when a still higher balance of the initial adhesive property and the heat resistance is required in the present invention, it is preferred that the gel content is from 5 to 30 wt %, and the weight average molecular weight of the sol is at least 500,000.

To obtain such a chloroprene latex adhesive, a well known polymerization method may be employed for the preparation so that the gel content of the chloroprene polymer would be from 3 to 40 wt % and the weight average molecular weight of the sol would be at least 400,000. However, as a high level of molecular control is required, it is preferred to carry out the preparation by the following method.

To obtain a chloroprene latex, a method of carrying out radical polymerization in an aqueous emulsion is a simple and industrially advantageous method. As the emulsifier to be used at that time, an emulsifier commonly employed for emulsion polymerization of chloroprene can be used. For example, an anionic emulsifier such as a rosinate, a fatty acid salt, an alkyl sulfonate such as sodium alkyl benzene sulfonate, an alkyl sulfate such as sodium lauryl sulfate, a non-ionic emulsifier, a cationic emulsifier, or a water-soluble polymer such as polyvinyl alcohol, may be mentioned. These emulsifiers may be used alone or in a combination of two or more of them. However, from the viewpoint of the water resistance of the obtained latex or control of the polymerization, it is preferred to use a rosinate, a fatty acid salt, an anionic emulsifier or a cationic emulsifier as the main component, and it is further preferred to employ a rosinate.

It is possible to control the molecular weight of the sol and the amount of the gel content in the chloroprene polymer by adjusting ① the use and the amount of use of the chain transfer agent, ② the polymerization temperature and ③ the final conversion of the monomer.

Firstly, the chain transfer agent is not particularly limited so long as it is one commonly employed for the production of a chloroprene polymer. For example, a known chain transfer agent, such as a long chain alkyl mercaptan such as n-dodecyl mercaptan or tert-dodecyl mercaptan, a dialkyl xanthogen disulfide such as diisopropyl xanthogen disulfide or diethyl xanthogen disulfide, or iodoform, may be used.

Next, the polymerization temperature is preferably within a range of from 0 to 55° C. from the viewpoint of control of the polymerization. However, to obtain a chloroprene polymer having a gel content of from 3 to 40 wt % and a weight average molecular weight of sol of at least 400,000 in the present invention, it is preferred to adjust the polymerization temperature to a level of from 5 to 30° C., and it is more preferred to carry out the polymerization at a low temperature of from 5 to 20° C. By carrying out the polymerization at a lower temperature, it is possible to suppress the gel content to a low level and to increase the weight average molecular weight of the sol. Further, by lowering the polymerization temperature, it is possible to increase the 1,4-trans structure in the chloroprene main chain and to obtain a chloroprene polymer having high crystallinity. Accordingly, after applying the adhesive, crystallization of chloroprene will proceed, whereby it is possible to obtain an adhesive layer having a high cohesive force.

The final conversion of the monomer is preferably within a range of from 80 to 95%. By adjusting the final conversion of the monomer to be within this range, it is possible to control the chloroprene polymer to have the desired gel content and the desired molecular weight of sol. To control the final conversion of the monomer to be within this range, a polymerization terminator such as phenotiazine, hydroxylamine or tert-butyl catechol may be added to terminate the polymerization so that the prescribed final conversion of the monomer is obtained.

Further, when the chloroprene polymer is a copolymer, the conversion of the monomer is represented by the weight% of the polymerized monomers based on the entire monomers involved in the copolymerization.

Further, the amount of the chain transfer agent may be adjusted so that the intended gel content and molecular weight of sol can be attained within such a range of the final conversion of the monomer. For example, when n-dodecyl mercaptan is used as the chain transfer agent, such can be attained by using it in an amount of from 0.06 to 0.15 parts by weight per 100 parts by weight of chloroprene and carrying out the polymerization so that the final conversion of the monomer is within a range of from 80 to 95%.

In the present invention, the solid content concentration of the chloroprene latex is preferably within a range of from 45 to 65 wt %, more preferably from 50 to 65 wt %, still more preferably within a range of from 55 to 65 wt %. The higher the solid content concentration, the better the initial adhesive property of the latex. Particularly under such a condition that complete drying can not be carried out, i.e. in a case where bonding is required to be carried out in a state where slight moisture remains, the effect for improving the initial adhesive performance by a high solid content concentration, will be remarkable.

Further, to make such a highly concentrated latex easy to handle and in a stabilized state, it is preferred to carry out polymerization of chloroprene in the presence of potassium rosinate and a large excess amount of potassium hydroxide, as emulsifiers. At that time, the amount of the rosinate is preferably within a range of from 1 to 10 parts by weight, more preferably from 3 to 5 parts by weight, per 100 parts by weight of chloroprene, and the amount of potassium hydroxide is preferably from 0.3 to 2 parts by weight, more preferably from 0.6 to 1.5 parts by weight, per 100 parts by weight of chloroprene. It is thereby possible to obtain a chloroprene latex which is excellent in low temperature stability or stability against phase separation when left to stand and which is also excellent in storage stability. For example, it is common to employ a method of adding sodium rosinate or sodium hydroxide as the excess alkali, but in such a case, as the concentration increases, the standing still stability or the low temperature stability is likely to deteriorate, which may bring about a practical trouble.

In the chloroprene latex of the present invention, a pH controlling agent, an antifreezing agent, etc., may be added after the polymerization. Further, at the time of its use, depending upon the characteristics required in its application, it is preferred to add a suitable amount of a rosinate resin, a terpene phenoric resin, a coumarone-indene resin, an aliphatic hydrocarbon resin or an aromatic petroleum resin as a tackifier resin and use it as an adhesive. In addition to these resins, a metal oxide such as zinc oxide, an inorganic filler such as calcium carbonate or silica, a plasticizer or a softening agent, such as dibutyl phthalate or process oil, further various antioxidant agents or vulcanization accelerators, curing agents such as isocyanates, thickners, etc., may optionally be incorporated.

The chloroprene latex adhesive obtained by the present invention is useful for bonding or joining the same or different types of materials such as paper, wood, cloth, leather, rubber, plastics, foams, potteries, glass, ceramics or metals. The application method for the bonding may be, for example, by brush coating, pallet coating, spray coating or roll coater coating. Further, bonding in a wet state is possible, an excellent initial adhesive performance can be obtained in either such bonding or contact bonding after drying, and the balance of the heat resistance, water resistance, etc., with the adhesive properties, is also excellent.

BEST MODE FOR CARRYING OUT THE INVENTION

Now, the present invention will be described in detail with reference to Examples, but these Examples by no means restrict the present invention. Further, parts and % in the following description will be represented by weight.

EXAMPLE 1

Using a reactor having an internal capacity of 3 l, in a nitrogen stream, 100 parts of water, 4 parts of disproportionated rosin acid, 1.0 part of potassium hydroxide and 0.8 part of a sodium salt of a formaldehyde/naphthalene sulfonic acid condensate, were charged and dissolved, and then, 100 parts of a chloroprene monomer and 0.1 part of n-dodecyl mercaptan were added with stirring. Using potassium persulfate as an initiator, polymerization was carried out in a nitrogen atmosphere at 10° C., and when the conversion of the monomer reached 90%, an emulsion of phenothiazine was added to terminate the polymerization. An unreacted monomer was removed under reduced pressure, to obtain a chloroprene latex. Further, the water was evaporated under reduced pressure to carry out concentration, whereby the solid content concentration was adjusted to be 60 wt %.

Then, with respect to this chloroprene latex, an adhesive composition was prepared in the formulation as identified in Table 1, and the adhesive properties were evaluated by the following methods.

Initial Adhesive Strength

On each of two sheets of canvas (25×150 mm), 200 g of the adhesive composition was coated by a brush and dried for 6 minutes in an atmosphere of 70° C. Then, the coated sides were bonded, followed by pressing by a hand roller.

Upon expiration of 10 minutes after the pressing, the 180° peel strength was measured by a tensile tester at a tensile speed of 50 mm/min.

Final State Adhesive Strength

On each of two sheets of canvas (25×150 mm), 200 g of the adhesive composition was coated by a brush and dried for 6 minutes in an atmosphere of 70° C. Then, the coated sides were bonded, followed by pressing by a hand roller.

Upon expiration of five days after the pressing, the 180° peel strength was measured by a tensile tester at a tensile speed of 50 mm/min.

Heat Creep Resistance Test

On each of two sheets of canvas (25×150 mm), 200 g of the adhesive composition was coated by a brush and dried for 6 minutes in an atmosphere of 70° C. Then, the coated sides were bonded, followed by pressing by a hand roller.

Upon expiration of 24 hours after the pressing, it was left to stand for 20 minutes in an atmosphere of 80° C. Then, in an atmosphere of 80° C., 200 g of a load was applied in the same manner as in the 180° peel test and left to stand for 30 minutes, whereby the length (mm) of the displacement of canvas was measured.

Water Resistance Strength

On each of two sheets of canvas (25×150 mm), 200 g of the adhesive composition was coated by a brush and dried for 6 minutes in an atmosphere of 70° C. Then, the coated sides were bonded, followed by pressing by a hand roller.

Upon expiration of 24 hours after the pressing, it was immersed in water for 2 days. Then, the 180° peel strength was measured by a tensile tester at a tensile speed of 50 mm/min.

Further, the gel content of the obtained chloroprene polymer and the molecular weight of the sol were measured in accordance with the following methods.

Measurement of the Gel Content

The latex sample was freeze-dried and accurately weighed to obtain A. It was dissolved in toluene at 23° C. for 20 hours (to a concentration of 0.6%), and using a centrifugal separator and further a metal net of 200 mesh, the gel was separated. The gel content was dried in air and then dried in an atmosphere of 110° C. for 1 hour and accurately weighed to obtain B.

The gel content was calculated in accordance with the following formula.

$$\text{Gel content} = B/A \times 100 (\%)$$

Measurement of the Molecular Weight

GPC measurement was carried out under the following conditions. The molecular weight was calculated as polystyrene.

The sample was prepared by forming the separated sol into a 0.1% THF solution.

Column: PL gel 10 μm GUARD+PL gel 10 μm Mixed-B×3 columns

Column size: 7.5 mm φ×50 mm (GUARD), 7.5 mm φ×300 mm (Mixed-B)

Column temperature: 35° C., Solvent:THF,

Flow out rate: 1 ml/min

Detector: SIMADZU RID-6-A

EXAMPLE 2

In Example 1, the amount of n-dodecyl mercaptan added was changed to 0.06 part, and polymerization was carried out and measurements of the adhesive properties, the gel content and the molecular weight were carried out in the same manner as in Example 1.

EXAMPLE 3

In Example 1, the amount of n-dodecyl mercaptan was changed to 0.15 part, and polymerization was carried out and measurements of the adhesive properties, the gel content and the molecular weight were carried out in the same manner as in Example 1.

EXAMPLE 4

In Example 1, the final conversion of the monomer was adjusted to 85%, and polymerization was carried out and measurements of the adhesive properties, the gel content and the molecular weight were carried out in the same manner as in Example 1.

EXAMPLE 5

In Example 1, the final conversion of the monomer was adjusted to 93%, and polymerization was carried out and measurements of the adhesive properties, the gel content and the molecular weight were carried out in the same manner as in Example 1.

EXAMPLE 6

In Example 1, the polymerization temperature was changed to 20° C., and polymerization was carried out and measurements of the adhesive properties, the gel content and the molecular weight were carried out in the same manner as in Example 1.

Comparative Example 1

In Example 1, the amount of n-dodecyl mercaptan added was changed to 0.04 part, and polymerization was carried out and measurements of the adhesive properties, the gel content and the molecular weight were carried out in the same manner as in Example 1.

Comparative Example 2

In Example 1, the amount of n-dodecyl mercaptan added was changed to 0.25 part, and polymerization was carried out and measurements of the adhesive properties, the gel content and the molecular weight were carried out in the same manner as in Example 1.

Comparative Example 3

In Example 1, the final conversion of the monomer was adjusted to 70%, and polymerization was carried out and measurements of the adhesive properties, the gel content and the molecular weight were carried out in the same manner as in Example 1.

Comparative Example 4

In Example 1, the final conversion of the monomer was adjusted to 97%, and polymerization was carried out and measurements of the adhesive properties, the gel content and the molecular weight were carried out in the same manner as in Example 1.

Comparative Example 5

In Example 1, the polymerization temperature was changed to 40° C., and polymerization was carried out and the measurements of the adhesive properties, the gel content and the molecular weight were carried out in the same manner as in Example 1.

The results of the foregoing Examples are shown in Table 1, and the results of the Comparative Examples are shown in Table 2.

TABLE 1

| | | Ex. 1 | Ex. 2 | Ex. 3 | Ex. 4 | Ex. 5 | Ex. 6 |
|---|---|---|---|---|---|---|---|
| Latex formulation (parts by weight) | Chloroprene | 100 | 100 | 100 | 100 | 100 | 100 |
| | n-dodecyl mercaptan | 0.10 | 0.06 | 0.15 | 0.10 | 0.15 | 0.10 |
| | Pure water | 100 | 100 | 100 | 100 | 100 | 100 |
| | Disproportionated rosin acid | 4 | 4 | 4 | 4 | 4 | 4 |
| | Potassium hydroxide | 1.0 | 1.0 | 1.0 | 1.0 | 1.0 | 1.0 |
| | Sodium salt of formaldehyde/naphthalene sulfonic acid condensate | 0.8 | 0.8 | 0.8 | 0.8 | 0.8 | 0.8 |
| Latex polymerization condition | Polymerization temperature ° C. | 10 | 10 | 10 | 10 | 10 | 20 |
| | Conversion of the monomer % | 90 | 90 | 90 | 85 | 93 | 90 |
| Latex properties | Solid content concentration % | 60 | 60 | 60 | 60 | 60 | 60 |
| | Gel content % | 10 | 34 | 5 | 5 | 25 | 30 |
| | Mw of sol $\times 10^{-4}$ | 65 | 50 | 60 | 75 | 55 | 50 |
| Adhesive blend formulation (parts by weight) | Latex | 100 | 100 | 100 | 100 | 100 | 100 |
| | Antioxidant Note 1 | 1 | 1 | 1 | 1 | 1 | 1 |
| | Zinc white Note 2 | 3 | 3 | 3 | 3 | 3 | 3 |
| | Resin Note 3 | 50 | 50 | 50 | 50 | 50 | 50 |
| Results of adhesive tests | Initial adhesive strength N/mm | 4.5 | 3.5 | 4.5 | 4.8 | 4.5 | 4.0 |
| | Final adhesive strength N/mm | 5.5 | 5.0 | 5.5 | 5.7 | 5.5 | 5.5 |
| | Heat creep resistance mm | 1 | 0 | 3 | 3 | 2 | 1 |
| | Water resistance strength N/mm | 4.9 | 4.3 | 4.9 | 5.0 | 4.7 | 4.5 |

Note 1 2,6-tert-butyl-4-methylphenol
Note 2 AZ-SW, manufactured by Osaki Kogyo K.K.
Note 3 Tamanol E-100, manufactured by Arakawa Kagaku Kogyo K.K.

TABLE 2

|  |  | Comp. Ex. 1 | Comp. Ex. 2 | Comp. Ex. 3 | Comp. Ex. 4 | Comp. Ex. 5 |
|---|---|---|---|---|---|---|
| Latex formulation (parts by weight) | Chloroprene | 100 | 100 | 100 | 100 | 100 |
|  | n-dodecyl mercaptan | 0.04 | 0.25 | 0.10 | 0.10 | 0.10 |
|  | Pure water | 100 | 100 | 100 | 100 | 100 |
|  | Disproportionated rosin acid | 4 | 4 | 4 | 4 | 4 |
|  | Potassium hydroxide | 1.0 | 1.0 | 1.0 | 1.0 | 1.0 |
|  | Sodium salt of formaldehyde/naphthalene sulfonic acid condensate | 0.8 | 0.8 | 0.8 | 0.8 | 0.8 |
| Latex polymerization condition | Polymerization temperature ° C. | 10 | 10 | 10 | 40 | 40 |
|  | Conversion of the monomer % | 90 | 90 | 70 | 97 | 90 |
| Latex properties | Solid content concentration % | 60 | 60 | 60 | 60 | 60 |
|  | Gel content % | 45 | 0 | 0 | 70 | 50 |
|  | Mw of sol ×10$^{-4}$ | 50 | 35 | 65 | 35 | 45 |
| Adhesive blend formulation (parts by weight) | Latex | 100 | 100 | 100 | 100 | 100 |
|  | Antioxidant Note 1 | 1 | 1 | 1 | 1 | 1 |
|  | Zinc oxide Note 2 | 3 | 3 | 3 | 3 | 3 |
|  | Resin Note 3 | 50 | 50 | 50 | 50 | 50 |
| Results of adhesive tests | Initial adhesive strength N/mm | 1.1 | 3.5 | 4.5 | 0.8 | 0.7 |
|  | Final adhesive strength N/mm | 5.0 | 4.5 | 5.7 | 5.0 | 4.7 |
|  | Heat creep resistance mm | 1 | Peeled | Peeled | 0 | 1 |
|  | Water resistance strength N/mm | 4.0 | 4.8 | 4.9 | 3.5 | 2.5 |

Note 1 2,6-tert-butyl-4-methylphenol
Note 2 AZ-SW, manufactured by Osaki Kogyo K.K.
Note 3 Tamanol E-100, manufactured by Arakawa Kagaku Kogyo K.K.

From comparison between the foregoing Examples and Comparative Examples, it is evident that the chloroprene latex adhesives employing the chloroprene latex compositions of the present invention are excellent in the initial adhesive properties and have a good balance of the heat resistance, water resistance, etc. with the adhesive properties. Thus, it is possible to provide chloroprene latex compositions which are particularly suitable for bonding of wood materials such as plywood, bonding of urethane foams or bonding of paper materials, etc.

What is claimed is:

1. A latex composition comprising a chloroprene polymer or copolymer having a gel content of from 3 to 40 wt % and having a weight average molecular weight of sol of at least 400,000, wherein the chloroprene polymer or copolymer is obtained by polymerizing chloroprene or by copolymerizing chloroprene with a comonomer with a rosinate emulsifier in the presence of a chain transfer agent at a temperature ≦30° C. to a monomer conversion of from 80 to 95%, wherein the solid content concentration in the latex is from 45 to 65 wt %.

2. The latex composition according to claim 1, wherein said emulsifier is potassium rosinate and the polymerization is carried out in the presence of excess potassium hydroxide.

3. An adhesive composition obtained by adding a tackifier resin to said latex composition as defined in any one of claims 1 to 2.

4. A method for producing a latex composition comprising:

polymerizing chloroprene or copolymerizing chloroprene with a comonomer with a rosinate emulsifier in the presence of a chain transfer agent at a temperature ≦30° C. to a monomer conversion of from 80 to 95%, and adjusting the solid content concentration in the latex to be from 45 to 65 wt %.

5. The method according to claim 4, wherein said temperature is from 5 to 30° C.

6. The method according to claim 4, wherein said temperature is from 5 to 20° C.

7. The method according to claim 4, wherein said emulsifier is potassium rosinate and said polymerizing or copolymerizing is carried out in the presence of excess potassium hydroxide.

* * * * *